(12) United States Patent
Johnson et al.

(10) Patent No.: US 12,212,800 B2
(45) Date of Patent: Jan. 28, 2025

(54) DEVICE AND METHOD FOR PROVIDING RELEVANT VIDEO CONTENT TO MEMBERS OF A COMMUNICATION GROUP

(71) Applicant: MOTOROLA SOLUTIONS, INC, Chicago, IL (US)

(72) Inventors: Eric Johnson, Chicago, IL (US); Yujing Su, Chicago, IL (US); Chun Wang, Oak Park, IL (US); Jeffrey Hirsch, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 598 days.

(21) Appl. No.: 16/227,254

(22) Filed: Dec. 20, 2018

(65) Prior Publication Data

US 2020/0204848 A1    Jun. 25, 2020

(51) Int. Cl.
*H04N 21/234*    (2011.01)
*H04N 21/239*    (2011.01)
(Continued)

(52) U.S. Cl.
CPC ... *H04N 21/2668* (2013.01); *H04N 21/23418* (2013.01); *H04N 21/2393* (2013.01);
(Continued)

(58) Field of Classification Search
CPC ........... G06K 9/00771; G08B 21/0476; H04N 21/2668; H04N 21/23418; H04N 21/2393;
(Continued)

(56) References Cited

U.S. PATENT DOCUMENTS 6,744,877 B1    6/2004 Edwards
6,757,362 B1    6/2004 Cooper et al.
(Continued)

FOREIGN PATENT DOCUMENTS

WO    2018056846 A1    3/2018

OTHER PUBLICATIONS

The International Search Report and The Written Opinion corresponding patent serial No. PCT/US2019/064852 filed Dec. 6, 2019, mailed: Feb. 14, 2020 all pages.

*Primary Examiner* — Yassin Alata
(74) *Attorney, Agent, or Firm* — Raguraman Kumaresan

(57) ABSTRACT

A process for providing relevant video content to members of a communication group. When a triggering event to provide video content to a plurality of members of a communication group is detected, an electronic computing device assigns a reviewer rank to each one of the plurality of members of the communication group based on a user context associated with the respective members. The device then selects a member with the assigned reviewer rank higher than the respectively assigned reviewer ranks of other members and further transmits a notification to the member requesting permission to provide the video content to the members of the communication group. When a response indicating permission is received from the communication device associated with the selected member, the device provides the video content to the members associated with the communication group.

15 Claims, 8 Drawing Sheets

(51) Int. Cl.
  *H04N 21/24* (2011.01)
  *H04N 21/258* (2011.01)
  *H04N 21/262* (2011.01)
  *H04N 21/2668* (2011.01)
  *H04N 21/6334* (2011.01)

(52) U.S. Cl.
  CPC ....... *H04N 21/24* (2013.01); *H04N 21/25866* (2013.01); *H04N 21/26291* (2013.01); *H04N 21/6334* (2013.01)

(58) Field of Classification Search
  CPC ............. H04N 21/24; H04N 21/25866; H04N 21/26291; H04N 21/6334
  USPC .......................................................... 725/10
  See application file for complete search history.

(56) References Cited

U.S. PATENT DOCUMENTS

| | | | |
|---|---|---|---|
| 7,023,979 B1 | 4/2006 | Wu et al. | |
| 7,472,197 B2 * | 12/2008 | Li | H04L 29/06027 370/486 |
| 2002/0049907 A1 * | 4/2002 | Woods | H04L 63/101 713/182 |
| 2008/0101339 A1 * | 5/2008 | Forbes | H04L 12/66 370/352 |
| 2009/0292722 A1 * | 11/2009 | Ayloo | G06Q 10/10 |
| 2011/0283190 A1 | 11/2011 | Poltorak | |
| 2011/0319117 A1 * | 12/2011 | Gonsalves | H04W 4/50 455/519 |
| 2014/0038668 A1 | 2/2014 | Vasavada et al. | |
| 2014/0124471 A1 | 5/2014 | Vihorev | |
| 2014/0167954 A1 * | 6/2014 | Johnson | H04W 76/10 340/539.11 |
| 2015/0054911 A1 * | 2/2015 | Gottlieb | A63F 13/215 348/14.08 |
| 2015/0206419 A1 | 7/2015 | Johnson et al. | |
| 2015/0347769 A1 * | 12/2015 | Espinosa | G06F 21/62 726/28 |
| 2016/0004390 A1 * | 1/2016 | Laska | G06F 3/048 715/723 |
| 2016/0080920 A1 * | 3/2016 | Baghel | H04W 4/90 455/404.1 |
| 2017/0099455 A1 * | 4/2017 | Mazzarella | H04W 4/90 |
| 2017/0243244 A1 * | 8/2017 | Trabelsi | G06Q 30/0255 |
| 2017/0277785 A1 | 9/2017 | Burke | |
| 2019/0206218 A1 * | 7/2019 | Kusens | G08B 21/0476 |
| 2019/0243917 A1 * | 8/2019 | Ashoori | G06F 16/3344 |
| 2020/0145358 A1 * | 5/2020 | Yegorin | H04L 51/26 |
| 2021/0297748 A1 * | 9/2021 | Gupta | H04N 21/4363 |

* cited by examiner

DEVICE AND METHOD FOR PROVIDING RELEVANT VIDEO CONTENT TO MEMBERS OF A COMMUNICATION GROUP

BACKGROUND OF THE INVENTION

Communication devices such as mobile phones and tablets are now in common use by users and provide users with instant access to increasingly valuable information and resources. Further, video has emerged as a critical medium for communication and collaboration among users. While streaming video has many benefits, the video medium demands substantial attention from viewers. The large volume of video information that can be streamed has the potential to overwhelm users. In particular, users working in public safety agencies often need to respond to emergency situations. Streaming large amount of video without considering their current situation is not beneficial for such users.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
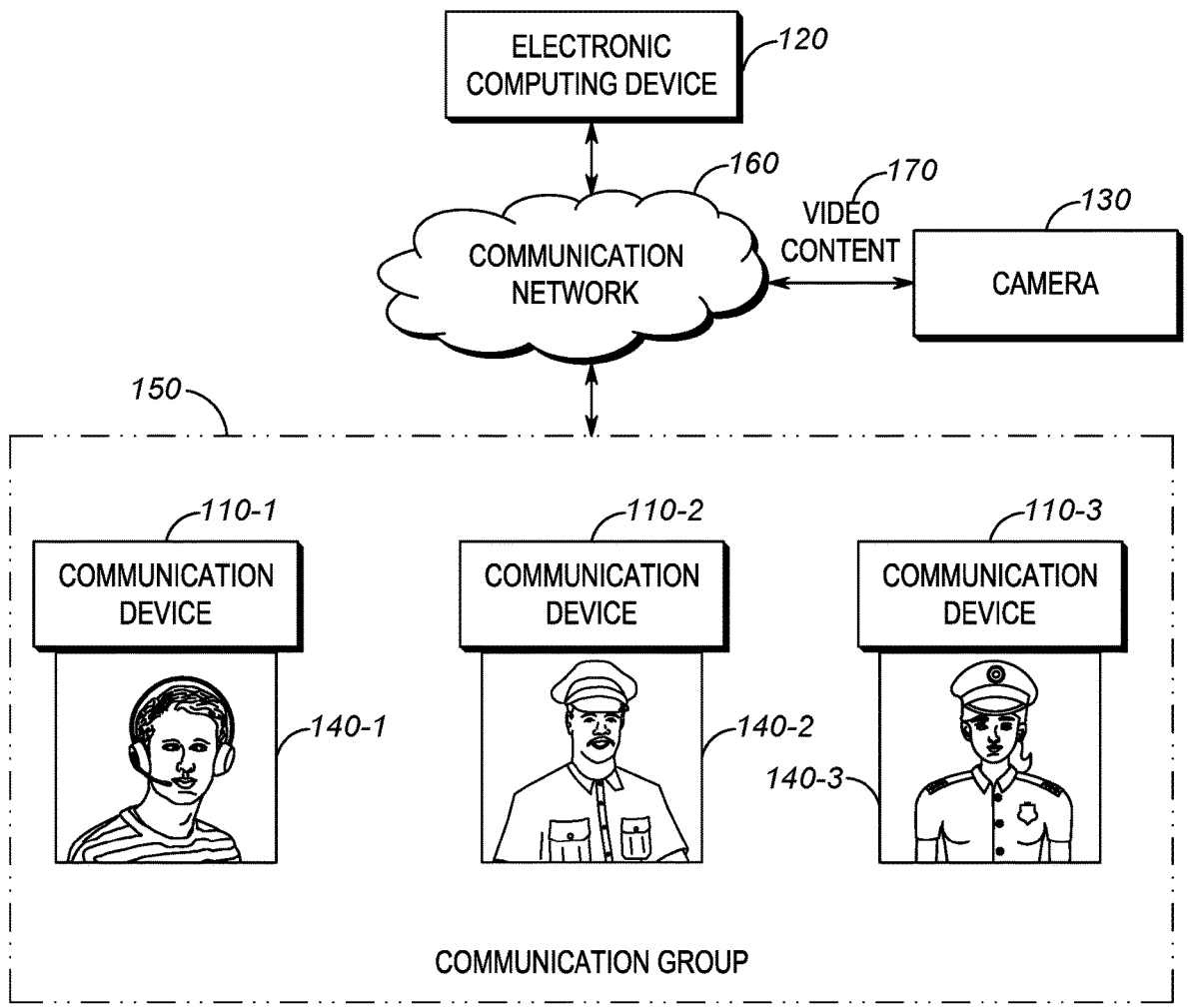
FIG. 1 is a system diagram illustrating a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Users such as public safety officers are often affiliated to communication groups (e.g., talk groups) to enable them to simultaneously communicate with multiple other users within the same group. Communicating in the group avoids the need for users to repeat the same message or establish different communication sessions to communicate the same message to different users.

Public safety officers such as first responders are continuously updated with incident related information to enable them to effectively respond to the incident. In some situations, it is necessary to provide video that may be considered relevant for the first responders to perform their tasks. However, the provider of the video may not readily know whether the video is actually relevant for users associated with a particular communication group. In some cases, the video may be related to the incident, but it may not be relevant for consumption considering the current situation of different users in the communication group. So, providing a video which is not relevant for consumption by the users may distract such users from performing their incident related tasks. On the other hand, it is possible that users in the communication group may miss some valuable information (e.g., information related to weapons carried by an offender) needed to effectively respond to the incident when a video including such valuable information is not provided to such users.

Disclosed is an improved technical process of providing relevant video to members of a communication group. One exemplary embodiment provides a method of providing relevant video content to members of a communication group. The method comprises: detecting, at an electronic computing device, a triggering event to provide video content to a plurality of members of a communication group; assigning, at the electronic computing device, a reviewer rank to each one of the plurality of members of the communication group based on a user context associated with the respective members; selecting, at the electronic computing device, from the plurality of members, a member with the assigned reviewer rank higher than the respectively assigned reviewer ranks of other members; transmitting, at the electronic computing device, to a communication device associated with the selected member, a notification requesting permission to provide the video content to the plurality of members of the communication group; and responsive to receiving permission from the communication device associated with the selected member, providing, at the electronic computing device, the video content to the plurality of members associated with the communication group.

Another exemplary embodiment provides an electronic computing device. The electronic computing device includes an electronic processor and a communications unit communicatively coupled to the electronic processor. The electronic processor is configured to: detect a triggering event to provide video content to a plurality of members of a communication group; assign a reviewer rank to each one of the plurality of members of the communication group based on a user context associated with the respective members; select, from the plurality of members, a member with the assigned reviewer rank higher than the respectively assigned reviewer ranks of other members; transmit, via the communications unit, to a communication device associated with the selected member, a notification requesting permission to provide the video content to the plurality of members of the communication group; and provide, via the communications unit, the video content to the plurality of members associated with the communication group.

Each of the above-mentioned embodiments will be discussed in more detail below, starting with an example system in which the embodiments may be practiced, followed by an illustration of processing steps for achieving the method of providing a relevant video content to members of a communication group. Further advantages and features consistent with this disclosure will be set forth in the following detailed description, with reference to the figures.

Referring now to drawings and in particular to FIG. 1, a system diagram illustrates a system 100 including a plurality of communication devices 110-1, 110-2, and 110-3, an electronic computing device 120, and a camera 130. The plurality of communication devices 110-1, 110-2, and 110-3, can be interchangeably referred to, collectively, as communication devices 110, and generically as a communication device 110. Although, only three communication devices are shown in FIG. 1 for illustrative purpose, any number of communication devices 110 may be deployed in the system 100. The communication devices 110-1, 110-2, and 110-3 may be operated by users 140-1, 140-2, and 140-3 (for example, public safety personnel), respectively, who may carry or wear the communication device 110. In accordance with some embodiments, the users 140-1, 140-2, 140-3 and the communication devices 110-1, 110-2, 110-3 are affiliated to the same communication group 150. Affiliation to the same communication group 150 enables the devices 110 to establish a communication session for simultaneously communicating with multiple other devices 110 that are associated with the same communication group 150. The users 140-1, 140-2, and 140-3 and the communication devices 110-1, 110-2, 110-3 can be interchangeably referred to as members 140-1, 140-2, and 140-3, respectively of the communication group 150. Although a single communication group 150 is shown in FIG. 1 for illustrative purpose, any number of communication groups with any number of members may be part of the system 100, and further the members 140 may also be associated with communication groups other than the communication group 150 shown in FIG. 1. The communication device 110 may be any computing device that is capable of receiving video content over a communication network 160 and further displaying the video content via an electronic display. In accordance with some embodiments, the communication device 110 includes one or more of: a handheld cellular telephone or portable two-way radio carried by public safety personnel, for example, police officers; a cellular communication device installed in a public safety vehicle, for example, a police vehicle; a mobile phone; a computer tablet; a laptop; a smart wearable, for example, a smart glass or smart watch; and the like.

The plurality of communication devices 110, the electronic computing device 120, and the camera 130 are communicatively coupled via a communication network 160. The communication network 160 is an electronic communications network including wired and wireless connections. The communication network 160 may be implemented using a combination of one or more networks including, but not limited to, a wide area network, for example, the internet; a local area network, for example, a Wi-Fi network, or a near-field network, for example, a Bluetooth™ network. Other types of networks, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof may also be used.

The electronic computing device 120 is, for example, a server that is configured to provide relevant video content to members 140 of a communication group 150 via the communication network 160 in accordance with the embodiments described herein. In some embodiments, the functionality of the electronic computing device 120 may be implemented at one or more of the communication devices 110 shown in FIG. 1. The camera 130 transmits video content 170 to the electronic computing device 120 via the communication network 160. For example, the video content 170 includes a combination of still image or moving images, audio, text, and associated metadata. The video content 170 may correspond to a public safety incident (e.g., a car accident, a bank robbery, an explosion, a suspect pursuit, and the like) that is captured by the camera 130 (e.g., a surveillance camera, dashboard camera of a patrol vehicle, mobile phone camera, and the like) which may be deployed near a location of the incident. In accordance with some embodiments, the electronic computing device 120 detects a triggering event to provide the video content 170 captured by the camera 130 to members (e.g., members 140) of a particular communication group (e.g., communication group 150), and further provides the video content 170 to members 140 of the particular communication group 150 only after receiving a permission from a member (e.g., a single member identified within the same communication group 150) who has been identified as capable of reviewing the video content 170 and further making a judgment call of whether the video is actually relevant for transmission to the members 140 of the particular communication group 150. In accordance with some embodiments, the electronic computing device 120, after receiving the permission from the member, joins the communication group 150 including interrupting an existing group call associated with the communication group 150 in order to provide the video content 170 to the members 140 of the communication group 150.

Figure 2:
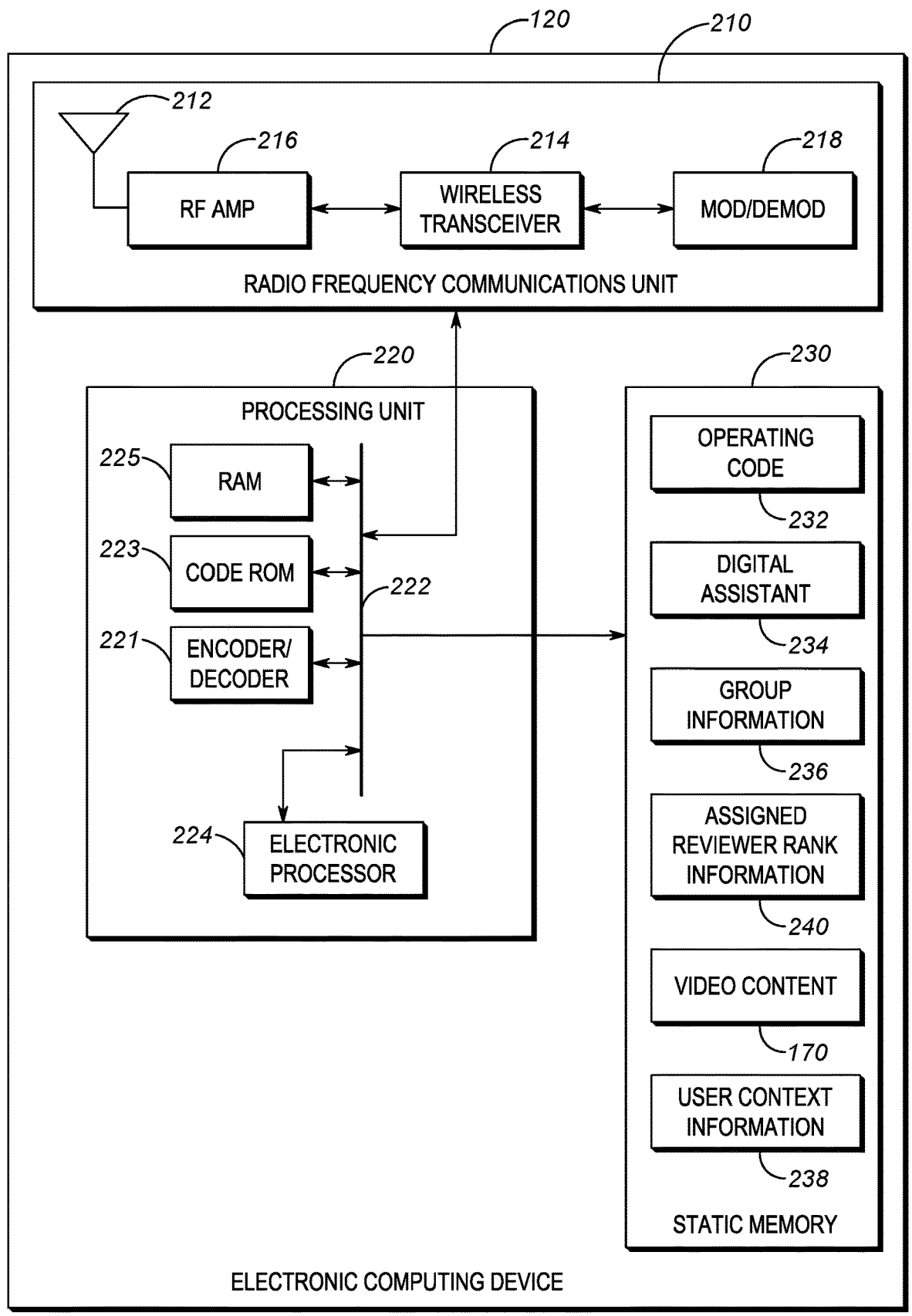
FIG. 2 is a device diagram showing a device structure of an electronic computing device of the system of FIG. 1 in accordance with some embodiments.

FIG. 2 is an example functional block diagram of an electronic computing device 120 operating within the system 100 in accordance with some embodiments. The electronic computing device 120 is an electronic device including a radio frequency communications unit 210, a processing unit 220, and a static memory 230. The electronic computing device 120 is presented as an example computing device that may be programmed and configured to carry out the functions described herein, for example, to provide relevant video content 170 to members 140 of a communication group 150. In some embodiments, depending on the type of electronic computing device 120, the electronic computing device 120 may include fewer or additional components in configurations different from that illustrated in FIG. 2. In other embodiments, the components associated with the electronic computing device 120 are implemented in a distributed manner in multiple electronic devices that interface and/or communicate with each other to perform the functions described herein. Other combinations are possible as well.

As shown in FIG. 2, the electronic computing device 120 includes a radio frequency communications unit 210 coupled to a common data and address bus 222 of a processing unit 220. The radio frequency communications unit 210 is a combined receiver and transmitter (e.g., transceiver) having a common antenna 212. The radio frequency communications unit 210 has a wireless transceiver 214 coupled to the antenna 212 via a radio frequency (RF) amplifier 216. The wireless transceiver 214 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The wireless transceiver 214 is also coupled to a combined modulator/demodulator (MOD/DEMOD) 218 that is coupled to the encoder/decoder 221. In some embodiments, the communications unit 210 may additionally, or alternatively include one or more wireline transceivers, such as Ethernet transceiver, a universal serial bus (USB) transceiver, or similar transceiver configured to communicate via a twisted pair wire, a coaxial cable, a fiber-optic link, or a similar physical connection to a wireline network.

The processing unit 220 may also include an encoder/decoder 221 with an associated code Read Only Memory (ROM) 223 for storing data for initializing system components and encoding and/or decoding voice or other traffic information (including image data, audio data, video data, text data, control signals, etc.) that may be transmitted or received by the electronic computing device 120. The processing unit 220 may further include an electronic processor 224 coupled, by the common data and address bus 222, to the encoder/decoder 221, a random access memory (RAM) 225, and a static memory 230.

The electronic processor 224 has ports for coupling to other interfaces (not shown) (e.g., user interface unit, electronic display, microphone, speaker, power source, and the like). The electronic processor 224 may include a microprocessor, a logic circuit, an application-specific integrated circuit (ASIC), a field-programmable gate array (FPGA), or another suitable electronic device. In some embodiments, the static memory 230 may store operating code 232 for the electronic processor 224 that, when executed by the electronic processor 224, perform one or more of the operations set forth in the figures and accompanying text. Static memory 230 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few.

In accordance with some embodiments, the static memory 230 comprises a digital assistant 234 that is implemented at the electronic computing device 120. The digital assistant 234 may be a software application running on underlying electronic hardware (e.g., electronic processor 224) that is capable of understanding natural language (i.e., unstructured input/data) and may complete electronic digital-assistant tasks in response to user voice inputs, detection of a contextual situation, and instructions received from other devices, among other additional or alternative type of inputs. In accordance with some embodiments, the electronic digital-assistant tasks include, but not limited to one or more of: using a video analytics engine to process video content 170 received from a camera 130 and further extract (e.g., by means of object classifiers) one or more attributes or features (e.g., vehicle type, make and color, body shape, hair color, skin tone, location, clothing pattern, voice or vocal characteristics, language spoken etc.,) corresponding to a person, object, or entity of interest that is identified from the video content 170; using video analytics/audio analytics/natural language processing engine to determine the intent and/or content of an unstructured input (e.g., monitored audio/text conversations that are exchanged between the members 140 of the communication group 150, oral query received from a member 140 of the group 150, etc.,); joining a group call associated with the communication group 150 as a virtual member in order to provide video content 170 that is identified as being relevant to members 140 of the communication group 150; monitoring the member interactions on the video content 170 presented on their respective communication devices 110 and further changing a playback operation (e.g., rewind/fast forward to an identified time frame, playback only particular video portion, adding annotations etc.,) corresponding to the video content 170 presented on the devices 110 and/or providing an updated video content 170 based on individual responses received from the members 140; and updating the video analytics/audio analytics engine using additional information (e.g., a feature related to an object of interest that was not previously identified by the video content by the electronic computing device 120) received from the members 140 of the communication group 150.

The static memory 230 also stores video content 170 received from the camera 130 for further processing and sharing the video content 170 when it is determined relevant to the communication group 150. In some embodiments, the video content captured by the camera 130 is stored at a remote storage server (not shown) and the electronic computing device 120 may have access to the video content 170 stored at remote storage server. In these embodiments, the static memory 230 may instead store an address (e.g., uniform resource link (URL)) of the remote storage server from which the video content 170 can be obtained for further processing. The video content 170 includes video data (still or moving images) of an incident area in a field of view of the camera 130. In addition, the video content 170 may also include audio data (e.g., speech) and metadata corresponding to the video content 170. The metadata corresponding to the video content 170 may include one or more of: person, object, or entity of interest that is identified from or annotated within the video content 170, type and identifier (e.g., computer aided dispatch (CAD) identifier) of an incident corresponding to which the video content 170 was captured, location at which the video content 170 was captured; and identifier of a video source (e.g., device identifier of the camera 130 and/or identifier corresponding to a user operating the camera 130) that captured the video content 170.

In accordance with embodiments, the electronic computing device 120 stores at the static memory 230, or has access to, group information 236 related to one or more communication groups (e.g., communication group 150). The group information 236 includes, for each communication group 150: a group identifier that uniquely identifies the communication group 150; and member identifier that uniquely identifies each member 140 and/or associated communication device 110 of the communication group 150. For example, the communication group 150 may include members 140 who are participating in a group call (e.g., audio or video conference call). In accordance with some embodiments, the electronic computing device 120 is configured to monitor communications (e.g., audio, video, text communications) transmitted between communication devices 110 of the respective members 140 in each of the communication groups 150 identified in the group information 236. In these embodiments, the electronic computing device 120 further processes the communications that may include natural language conversational exchanges between members 140 of the communication group 150 using audio analytics/NLP engine to identify whether conversational exchanges within any particular communication group 150 are relevant (e.g., a person of interest referred to in the conversation matches with a person identified from the video content 170) to the video content 170 received or being streamed from the camera 130. If the conversational exchanges within the particular communication group 150 are identified as relevant to the video content 170, then the electronic computing device 120 may determine that the video content 170 is potentially relevant to the particular communication group 150. In some embodiments, the electronic computing device 120 may determine that the video content 170 is also potentially relevant to one or more other communication groups (in addition to communication group 150 shown in FIG. 1) after similarly identifying that the conversational exchanges within the other communication groups are also relevant to the video content 170.

The electronic computing device 120 further stores (or has access to) user context information 238 at the static memory 230 for each member of a communication group, for example, communication group 150 for which the electronic computing device 120 has determined that the video content 170 is potentially relevant. In one embodiment, the electronic computing device 120 stores or accesses the user context information 238 for members of all the communication groups for which group information 236 is available to the electronic computing device. In this embodiment, the electronic computing device 120 uses the user context information 238 (e.g., conversational exchanges) of the members of the communication group to identify whether the video content is potentially relevant to one or more of the communication groups. In another embodiment, the electronic computing device 120 stores or accesses the user context information 238 for only members 140 of a particular communication group 150 for which the video content 170 is identified as being potentially relevant. In these embodiments, the electronic computing device 120 may begin the process of obtaining user context information 238 for each member 140 in a given communication group 150 only after receiving a notification (e.g., from a dispatcher via the computer aided dispatch (CAD) server) that the video content is relevant for the given communication group 150. The electronic computing device 120 may receive the user context information 238 for each member 140 from the corresponding communication device 110, sensor devices (not shown) (e.g., heart rate monitor, location sensor, accelerometer, camera, and the like) that are associated with the member 140, or a central server (not shown) (e.g., CAD server) that is configured for obtaining (and updating) in real time, user context information 238 for each member 140 of the communication group 150. The user context information 238 includes user context parameters selected from the group consisting of: a location (current or historical) of the member 140; an agency (e.g., police, medical, or firefighter agencies) to which the member 140 is affiliated; rank, experience, role, skill level, or knowledge level (e.g., member's knowledge about a particular equipment shown in the video content 170) of the member 140, conversations (current or historical conversations of a member 140 within or outside the group 150) or actions (e.g., member's interactions relative to previously shared video content) associated with the members 140; sensor data (e.g., health data such as heart rate measured by a sensor) associated with the member 140; and incident (e.g., CAD ID) assigned to the member 140.

In accordance with embodiments, the electronic computing device 120 uses the user context information 238 for a respective member 140 of the communication group 150 to select a particular communication group 150 for which the video content 170 is potentially relevant and further to assign a reviewer rank for each member 140 in the selected group 150. The electronic computing device 120 stores, at the static memory 230, assigned reviewer rank information 240 for each member 140 associated with the selected communication group 150. The reviewer rank is assigned to each member 140 of the group 150 based on the user context associated with the member 140. As an example, a member 140 who provided information about a particular person (identified as person of interest in the video content 170) during the conversation with other members 140 in the communication group 150 may have a higher reviewer rank than another member 140 who did not provide any information related to the person. In one embodiment, the reviewer rank is assigned based on an overall correlation between the video content 170 and each parameter associated with the user context information 238. As an example, a member 140 may have a higher correlation (e.g., 100% correlation) with the video content 170 based on a matching of a particular location identified from the video content 170 with a location (i.e., as identified from location parameter of the user context information 238) of the member 140, and the same member 140 may have a lower correlation (e.g. 30% correlation) with the video content 170 based on matching of a skill set required to identify a weapon displayed within the video content 170 with the actual skill set of the member 140. In this case, the electronic computing device 120 determines that the member 140 has an overall correlation of 65% between the video content 170 and member's user context and further this member 140 may have an assigned reviewer rank that is lower than another member 140 who has an overall correlation of 85% (e.g., with 90% correlation for location parameter and 80% correlation for skillset parameter) between the video content 170 and the other member's user context.

The electronic computing device 120 uses the assigned reviewer rank information 240 to select a member 140 with the assigned reviewer rank higher than respectively assigned reviewer ranks of other members 140. The electronic computing device 120 then transmits a notification to the selected member 140 requesting permission to provide the video content 170 to the member's communication group 150, and then provides the video content 170 to the members 140 of the communication group 150 when it receives a permission from the communication device 110 of the selected member 140.

In accordance with embodiments, the communication device 110 includes one or more similar components as illustrated in FIG. 2. In one embodiment, the communication device 110 includes a processing unit with an electronic processor, a communications unit, a memory, an electronic display (e.g., to display the video content 170), a speaker, a user interface unit, and a power source to perform the functions described herein.

Figure 3:
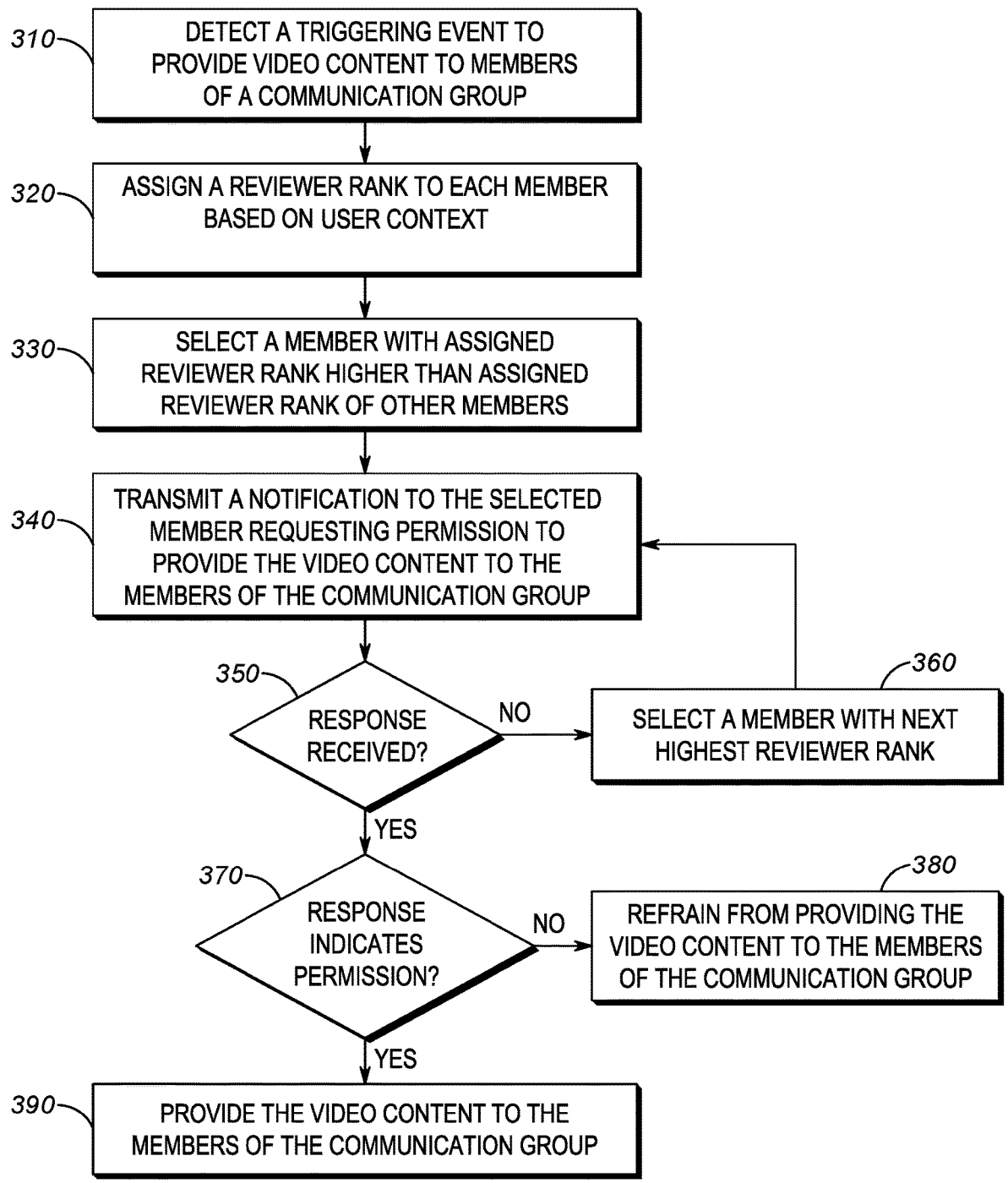
FIG. 3 illustrates a flowchart of a method for providing relevant video content to members of a communication group in accordance with some embodiments.

FIG. 3 illustrates a flow chart diagram of a method 300 of providing relevant video content to members 140 of a communication group 150. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The method 300 shown in FIG. 3 can be performed by one or more components of the electronic computing device 120, and will be described with reference to the functions and components of the system 100. Some of the features described in the method 300 may be performed via the digital assistant 234 using underlying hardware such as an electronic processor 224 implemented at the electronic computing device 120.

At block 310, the electronic computing device 120 detects a triggering event to provide video content 170 to members 140 of a communication group 150. The electronic computing device 120 detects the triggering event when the video content 170 received from the camera 130 is determined as potentially relevant to one or more communication groups 150 identified in the group information 236 stored at the memory 230. In one embodiment, the electronic computing device 120 monitors communications (e.g., video, audio, or text) transmitted between communication devices 110 of members 140 within each communication group 150 identified in the group information 236. The electronic computing device 120 further processes the communications (e.g., communications including natural language conversations) using NLP engine to determine whether the communications are related to the video content 170. As an example, a particular one or more conversations may be determined to be related to the video content 170 when the conversation refers to a person of interest (e.g., a suspect) with particular characteristics (e.g., facial characteristics and/or description of clothes worn or objects carried by the person) and further when the characteristics referred to in the conversation match with the features of a person identified from the video content 170. In accordance with some embodiments, the electronic computing device 120 is configured to process the video content 170 using video analytics engine to identify such relevancy between the characteristics referred to in the conversation with the features extracted from the video content 170. In some embodiments, when the video content 170 corresponds to a live video stream received from the camera 130 (e.g., a surveillance camera), the electronic computing device 120 continuously processes the live video stream to extract features such as person, object, or entity of interest and further compares the extracted features with real time conversations to determine whether the live video stream is relevant for sharing with members 140 of a communication group 150.

In another embodiment, the electronic computing device 120 detects the triggering event when a notification received from a dispatcher (e.g., via a CAD server) indicates that the video content 170 is to be provided to an identified communication group 150. For example, the received notification may include the video content 170 (or alternatively a resource identifier corresponding to a storage device at which the video content 170 can be accessed) and group information 236 (e.g., group identifier and member identifiers) for each communication group 150 for which the video content 170 is to be provided. In yet another embodiment, the electronic computing device 120 detects the triggering event when a user input received at the electronic computing device 120 identifies the video content 170 as well as the communication group 150 to which the video content 170 is to be provided.

Next, at block 320, the electronic computing device 120 assigns a reviewer rank to each one of the plurality of members of the communication group 150 (as identified at block 310) based on a user context associated with the respective members 140. In one embodiment, the electronic computing device 120 selects a plurality of parameters associated with user context of a member 140. For example, the selected user context parameters may include one or more of: a location of the member 140; an agency to which the member 140 is affiliated; rank, experience, role, skill level, or knowledge level of the member 140, conversations or actions associated with the members 140; sensor data associated with the member 140; incident assigned to the member 140; associated device/network capability; and the like. In some embodiments, a level of correlation between the video content and user context is used to assign the reviewer ranks. In these embodiments, the electronic computing device 120 dynamically assigns a weight to each of the user context parameters according to a level of correlation between the video content 170 and respective user context parameter. For example, the electronic computing device 120 may use a predefined correlation function that determines a level of correlation between the video content 170 and user context parameter and further outputs a weight that is calculated based on the level of correlation. The correlation function may determine the level of correlation in terms of percentage (e.g., 100% correlation, 50% correlation, 0% correlation, etc.,) and further the weight may be expressed in the range of zero to one (0 through 1) numerical unit. The level of correlation may be 100% when there is an exact match for example, between "a location" mentioned in the conversation and "a location" as identified from the video content 170, and the level of correlation may be 50% when only characteristics identified from the conversation matches with the features extracted from the video content 170. To provide few examples, the correlation function may output the weight as '1' when the level of correlation is '100%', weight as '0.5' when the level of correlation is '50%', and weight as '0' when the level of correlation if '0%'.

Below is an example table (Table-I) that illustrates the weight assigned to each member 140 corresponding to each of the defined/selected user context parameters based on the level of correlation between the video content 170 and the user context as identified by the respective user context parameter.

TABLE I

Example of user context parameters and assigned weights

| User Context Parameter | Assigned Weight | | |
|---|---|---|---|
| | Member 140-1 | Member 140-2 | Member 140-3 |
| Location | 0 | 1 | 1 |
| Agency | 1 | 0 | 0 |
| Rank | 0 | 0 | 1 |
| Experience | 0.3 | 1 | 0.8 |
| Role | 0.5 | 0 | 0.8 |
| Skill/Knowledge | 1 | 1 | 0.8 |
| Conversations/Actions | 1 | 0.6 | 0.5 |
| Sensor Data | 1 | 0 | 0 |
| Assigned Incident | 1 | 1 | 0 |
| Total Weight | 5.8 | 5 | 4.4 |
| Assigned Reviewer Rank | 1 | 2 | 3 |

As illustrated in Table-I above, the members 140-2 and 140-3, each are assigned a weight of one (1) for "location" parameter, because the current location of the members 140-2 and 140-3 matches (i.e., a high level correlation of 100%) the location of an incident corresponding to which the video content 170 was captured. Similarly, the member 140-1 is assigned less weight (i.e., a weight of zero (0)) than members 140-2 and 140-3 for the same parameter (i.e., "location" parameter) because the current location of the member 140-1 does not match with the location of the incident corresponding to which the video content 170 was captured. On the other hand, member 140-1 is assigned higher weight (i.e., weight of one (1)) for the "conversation/actions" parameter than members 140-2 and 140-3 because the electronic computing device 120 has identified that the member's 140-1 conversation for example, describing characteristics of a suspect, matches with the features of the person identified in the video content 170. In this case, member 140-3 is assigned a weight of 0.5 because the level of correlation between member 140-3's conversation and the video content 170 is determined as 50% and member 140-2 is assigned a weight of 0.6 because the level of correlation between member 140-2's conversation and the video content 170 is determined as 60%. In any case, after the weights are assigned for each member 140 for all of the selected user context parameters, a total weight is calculated for each member 140 by summing the respective weights assigned to each of the parameters. The electronic computing device 120 then assigns a reviewer rank to each member 140. The electronic computing device 120 may use a predetermined ranking function that ranks each member 140 according to the total weight calculated for the respective member 140. In other words, the ranking function ranks the members 140 in a manner, such that a member 140 with highest reviewer rank has a total weight that is higher than respective total weights of the other members 140. For example, as illustrated in Table-I, member 140-1 is assigned the highest reviewer rank (i.e., Rank 1) because the total weight calculated for member 140-1 is higher than the total weights of member 140-2 and 140-3. Similarly, the next highest reviewer rank is assigned to member 140-2 and the lowest reviewer rank is assigned to member 140-3 according to the respective total weights calculated for members 140-2 and 140-3. While Table-I shows that a total of 9 user context parameters are being selected for determining reviewer ranks to the members 140 of the communication group 150, in other embodiments, more or less number of user context parameters can be selected for determining the reviewer rank. For example, the electronic computing device 120 can be configured to perform correlation and further assign rank only based on the level correlation between the "location" parameter and the "location" associated with the video content 170. In this case, a member 140 with current location matching the location associated with the video content 170 may be assigned higher reviewer rank than another member 140 with current location not matching the location associated with the video content 170.

In another embodiment, a weight factor independent of the level of correlation between the user context parameter and video content 170 may be used to determine the reviewer ranks of the members 140 when one or more user context parameter is considered as more relevant or significant for assigning a higher or lower reviewer rank to a member 140. For example, when the sensor data indicates that the user is stressed or may not be in a condition (e.g., sensor data indicates that user has removed the gun from the holster) or may not be available (e.g., user is driving) to review the video content 170 and further judge whether the video is relevant for providing to the communication group 150, the weight factor may be used to lower the reviewer rank. Similarly, when one member 140 is identified as a highest ranking authority (e.g., a commanding officer) within the communication group 150, a weight factor may be used to raise the reviewer rank. As an example, if a patrol officer has experience responding to incidents of a particular type (e.g. burglaries) in a particular part of a neighborhood, this would increase the weight(s) associated with the officer's knowledge-related user context parameter. Because of officer's experience, the officer may recognize as harmless a person identified by video analytics as a potential suspect (e.g., because they match a suspect description like "wearing a gray hoodie"). Because of the weight factor, the experienced officer would be assigned a higher reviewer rank than a tactical support operator, who may be several miles away and may not have knowledge about the particular neighborhood and people living there.

In some embodiments, a plurality of sub-parameters may be defined by the electronic computing device 120 for each user context parameter. In these embodiments, the electronic computing device 120 may assign weight for each sub-parameter to each member 140 according to a level of correlation between the video content 170 and sub-parameter, or alternatively based on the sub-parameter itself. For example, when the user context parameter is defined as 'conversations/actions', the sub-parameters may be defined to include one or more of: authoritativeness, verbosity; level of involvement/engagement; role of the user as determined from the conversation; keywords; semantic understanding beyond keywords; tone; inflection; prosody; availability; and the like. In this example, the reviewer rank may be determined further as a function of the weights assigned to each of the sub-parameters defined by the electronic computing device 120.

In some of the above embodiments, a reviewer rank may be assigned only (i.e., without correlating it to the video content) based on the user context parameters of the respective members. For example, the reviewer ranks may be assigned based on a level of activity or engagement (as determined from user context information 238) by the members 140 within the communication group 150. The level of activity of a member 140 may be determined by processing the conversations or actions associated with the member 140 using NLP engine. The level of activity may correlate with one or more of: verbosity of the member's conversations, number of conversations, tone of the member's conversation, member's authoritativeness as identified from the conversation, role of the member, member's availability, and the like. For example, a member with higher number of conversations or high verbosity may be determined to be more active or engaged in the communication groups than other members, and accordingly the member may be assigned the highest reviewer rank within the communication group. The reviewer ranks may also be assigned based on the reviewer rankings historically assigned to the members 140 of the communication group 150. Further, the reviewer ranks may be assigned based on user input received at the electronic computing device 120 or alternatively based on the notification received from the dispatcher via the CAD server. Other variations of the above discussed methodologies can be performed to adjust the individual weights associated with the user context parameter or the total weight calculated for the member 140 or the overall reviewer rank assigned to the member 140.

Next, at block 330, the electronic computing device 120 selects a member 140 with assigned reviewer rank higher than respectively assigned reviewer rank of other members. In the example shown in Table-I, the electronic computing device 120 selects member 140-1 because member 140-1 has a reviewer rank that is higher than the reviewer ranks of other members 140-2, 140-3.

At block 340, the electronic computing device 120 transmits a notification to a communication device 110-1 associated with the selected member 140-1 requesting permission to provide the video content to the members 140 of the communication group 150. In accordance with some embodiments, the notification includes the entire video content 170 or only a portion of the video content 170 received from the camera 130. For example, the portion may include a snapshot of the video content 170 with annotations highlighting a particular person, object, or identity of interest that is identified based on processing the video content 170. In other embodiments, the notification may also include metadata (e.g., description of the video content or information related to person, object, or entity of interest identified from the video content 170) associated with the video content 170. The notification may also include an indication for the member 140-1 to review the video content 170 and further determine whether the video content 170 is actually relevant for the communication group 150. In some embodiments, the notification causes the communication device 110-1 associated with the member 140-1 to display the video content 170 (or portion of the video content 170) and may further provide a response mechanism (e.g., a graphical user interface button displayed on a touch screen of the communication device 110-1) that enables the member 140-1 to either accept or decline the request to provide permission to the electronic computing device 120 to provide the video content 170 to the members 140 of the communication group 150. In one embodiment, the electronic computing device 120 selects, at block 330, more than one member 140, for example, two members 140-1, 140-2 with highest reviewer ranks than other members 140 in the group, and further transmits a notification, at block 340, to respective communication devices 110-1, 110-2 associated with the two members 140-1, 140-2 to request permission to provide video content 170 to members 140 of the communication group 150.

Next, at block 350, the electronic computing device 120 determines whether it has received a response from the communication device 110-1 associated with the selected member 140-1. If no response is received before expiry of a pre-defined timer, the electronic computing device 120 proceeds to block 360 to select a member 140 with next highest reviewer rank. As used herein, the term "next highest reviewer rank" refers to a member 140 with reviewer rank higher than other members 140 in the communication group 150 excluding the previously notified members. From the example shown in Table-I, if no response is received from member 140-1, the electronic computing device 120 selects member 140-2 who has a lower rank than the previously notified member 140-1, but has a higher rank than the other member 140-3 in the communication group 150. After selecting a member 140-2 with next highest reviewer rank, the electronic computing device 120 returns to block 340 to transmit a notification to a communication device 110-2 of the member 140-2 with next highest reviewer rank requesting permission to provide the video content 170 to the communication group 150. The functions shown in block 340, 350, and 360 are repeated until a permission is received from one of the members 140 of the communication group 150 or the notification has been transmitted to all the members 140 of the communication group 150.

Returning to block 350, when the electronic computing device 120 receives a response from the communication device 110-1 associated with the selected member, 140-1, the electronic computing device 120 checks whether the received response indicates a permission to provide the video content 170 to the members 140 of the communication group 150. If the received response indicates that the permission is not provided, the electronic computing device 120, as shown in block 380 refrains from transmitting the video content 170 to the members 140 of the communication group 150. For example, the member 140-1 receiving the notification may determine that the video content 170 is not actually relevant for sharing with members 140 of the communication group 150 or alternatively may determine that the members 140 are not available (e.g., members are attending to another high priority task), and may further provide a response (e.g., via the response mechanism provided at the communication device 110-1) declining to provide permission to provide the video content 170 to members 140 of the communication group 150. In some embodiments, the response received from the communication device 110-1 associated with the member 140-1 may also include information identifying one or more reasons for the member's determination that the video content 170 is not relevant to the communication group 150. In accordance with some embodiments, the response received from the member may correspond to an unstructured natural language input (for example, a speech input). In these embodiments, the electronic computing device 120 uses the NLP engine to process the received response and determine whether the member 140-1 has provided permission to provide the video content 170. In accordance with some embodiments, the electronic computing device 120 uses the response received from the member 140-1 of the communication device 110-1 and the associated reasons (which may be in the form of unstructured natural language) for not providing permission to provide video content 170 to the communication group 150 to improve the video analytics engine.

As an example, assume that the members 140 of a communication group 150 are discussing about a suspect wearing a red shirt. The electronic computing device 120 monitoring this conversation determines that video content 170 received from the camera 130 identifies a person with a red shirt. Based on a high level of correlation (i.e., based on features such as 'color' and 'clothing') between the conversation and the video content 170, the electronic computing device 120 determines that the video content 170 is potentially relevant for the communication group 150 and further transmits a notification to a selected member (e.g., member 140-1) with highest reviewer rank within the communication group 150. The selected member 140-1 with the highest reviewer rank receives a notification with a message "potential suspect wearing a red shirt found, share video with the group?" from the electronic computing device 120. This notification may include specific details about the video content 170 as well as a snapshot of the person with the red shirt or the entire video content 170 received from the camera 130. In response, the electronic computing device 120 receives a notification in which the member 140-1 declines the request to share the video content 170 with the group 150. The received notification also further includes a natural language response from the member 140-1 indicating that the video content 170 is not relevant as the person in the video content 170 also wears a red hat and apparently the person is a pizza delivery driver in contrast to the person being discussed in the conversation who does not wear a red hat. This response causes the electronic computing device 120 to continue looking for video content 170 with a person in red shirt and without a red hat. In addition, the electronic computing device 120 may also update its video analytics engine to store uniform data for pizza delivery drivers for use in processing video content 170 associated with subsequent incidents.

As another example, assume that the members 140 of a communication group 150 are discussing about a suspicious blue van heading in a north direction on Route 43. The electronic computing device 120 monitoring this conversation determines that video content 170 received from the camera 130 shows a blue van. Based on a high level of correlation (i.e., based on features such as 'color' and 'type of vehicle') between the conversation and the video content 170, the electronic computing device 120 determines that the video content 170 is potentially relevant for the communication group 150 and further transmits a notification to a selected member (e.g., member 140-1) with highest reviewer rank within the communication group 150. For example, the member 140-1 with the highest reviewer rank receives a notification with a message "potential suspect vehicle found, a blue van heading north on Route 43, share video with the group?" from the electronic computing device 120. This notification may include specific details about the video content 170 as well as a snapshot of the blue van or the entire video content 170 received from the camera 130. In response, the electronic computing device 120 receives a notification in which the member 140-1 declines the request to provide permission to share the video content 170 with the group 150. The received notification also further includes a message from the member 140-1 indicating that the video content 170 is not relevant as the "blue van" identified in the video is further associated with a text "discount plumbing" whereas the "blue van" in the conversation is associated with "masonry repair." This response causes the electronic computing device 120 to continue looking for blue vans heading in the north direction on Route 43, but only those with the text "discount plumbing" on them. In addition, the electronic computing device 120 may also update its video analytics engine to store associations between businesses and fleet vehicle features that can be used in processing video content 170 associated with subsequent incidents.

As a further example, assume that the members 140 of a communication group 150-1 are discussing about suspicious visitors at a given address. The electronic computing device 120-1 monitoring this conversation determines that video content 170 received from the camera 130 shows someone arriving at the given address. Based on a high level of correlation (i.e., based on features such as 'person' and 'address') between the conversation and the video content 170, the electronic computing device 120 determines that the video content 170 is potentially relevant for the communication group 150 and further transmits a notification to a selected member (e.g., member 140-1) with highest reviewer rank within the communication group 150. For example, the member 140-1 with the highest reviewer rank receives a notification with a message "potentially suspicious visitor at the address, share video with the group?" from the electronic computing device 120. This notification may include specific details about the video content 170 as well as a snapshot of the person arriving at the given address or the entire video content 170 received from the camera 130. In response, the electronic computing device 120 receives a notification in which the member 140-1 declines the request to share the video content 170 with the group 150. The received notification also further includes a message from the member 140-1 indicating that the video content 170 is not relevant as the "person" shown in the video is actually a tenant at the given address and further the person is not to be regarded as suspicious. This response causes the electronic computing device 120 to continue monitoring the address while ignoring the person regarded as tenant and not suspicious. In addition, the electronic computing device 120 may also update its video analytics engine to store the person's biometric data and status as a tenant for use in processing video content 170 associated with subsequent incidents.

In accordance with some embodiments, the response received from the selected member 140-1 are used to update the weights assigned to each member 140-1 for the corresponding user context parameter or alternatively to update the reviewer rank. As an example, assume that the members 140 of a communication group 150 are discussing about a suspicious green color sports utility vehicle (SUV) of a given brand. The electronic computing device 120 monitoring this conversation determines that video content 170 received from the camera 130 shows a potentially suspicious green color SUV. Based on a high level of correlation (i.e., based on features such as 'vehicle type' and 'color') between the conversation and the video content 170, the electronic computing device 120 determines that the video content 170 is potentially relevant for the communication group 150 and further transmits a notification to a selected member (e.g., member 140-1) with highest reviewer rank within the communication group 150. The member 140-1 with the highest reviewer rank receives a notification with a message "potentially suspicious green color SUV found, share video with the group?" from the electronic computing device 120. This notification may include specific details about the video content 170 as well as a snapshot of the vehicle or the entire video content 170 received from the camera 130. In response, the electronic computing device 120 receives a notification in which the member 140-1 neither declines nor accepts the request to share the video content 170 with the group. For example, the response notification includes natural language response with message "I'm not sure, I don't know a lot about vehicles, Officer Smith is a vehicle expert." The response causes the electronic computing device 120 to select "Office Smith" (e.g., member 140-3) by elevating the rank of "Officer Smith" based on the response received from the member 140-1. In this case, member 140-3 is selected even though the member 140-3 has lower reviewer rank than member 140-2. The electronic computing device 120 further forwards the notification along with a snapshot of the vehicle to a communication device 110 associated with "Officer Smith." In response, "Officer Smith" provides a message "No, that is a Brand A vehicle, we are looking for a Brand B vehicle." This response causes the electronic computing device 120 to look for green SUVs of Brand B, and further associate the SUV shape identified in the video content 170 with Brand A for use in processing video content 170 associated with subsequent incidents. In addition, the electronic computing device 120 may update the profile data/user context of the member 140-1 with a tag "not a vehicle expert" and similarly update the profile data/user context of "Officer Smith" (i.e., member 140-3) to "vehicle expert." These expertise-related attributes can be used as context to assign rankings when a subsequent video content is being identified for providing to a communication group 150.

Returning to block 370, when the electronic computing device 120 receives a response from a communication device 110-1 associated with the selected member 140-1 indicating permission to provide the video content 170 to the members 140 of the communication group 150, the electronic computing device 120 proceeds to block 390 to provide the video content 170 to each member 140 of the communication group 150. In accordance with some embodiments, when the electronic computing device 120 determines that the members 140 of the communication group 150 are actively participating in an existing group call that is established between their respective communication devices 110, the electronic computing device 120 may interrupt the existing group call and further transmit the video content 170 to respective communication devices 110 associated with the members 140 of the communication group 150 via the existing group call over the communication network 160. For example, when the members 140 are already participating in a video conference call, the electronic computing device 120 joins the video conference call as a participant and further transmits the video content 170 to the communication devices 110 of the members 140 via the video conference call. If the call corresponds to a half-duplex talk group call, the electronic computing device 120 may request a talk group server to grant talk group resources (e.g., talk group channel and floor) so that the electronic computing device 120 can join the talk group call and further transmit the video content 170 that can be simultaneously received by all members 140 of the communication group 150. In other embodiments, the electronic computing device 120 may also transmit the video content 170 to each member 140 of the communication group 150 by individually transmitting (e.g., via a private call over the communication network 160) the video content 170 to a respective communication device 110 associated with each member 140 of the communication group 150. In these embodiments, the electronic computing device 120 may not send the video content 170 again to the member 140-1 if the video content 170 to be provided is similar to the video content 170 provided with the notification transmitted to the selected member 140-1 at block 340. Alternatively, in these embodiments, the electronic computing device 120 may again send the video content 170 to the member 140-1, for example, when the video content 170 corresponds to a live video stream and/or includes video data not previously provided to the member 140-1.

In accordance with some embodiments, the electronic computing device 120, after providing the video content 170 to the members 140 of the communication group 150 continues to process the video content 170 (e.g., video stream) received from the camera 130 and repeats the functions described with reference to blocks 320 through 390 when a triggering event is detected. Similarly, the electronic computing device 120 also performs additional digital-assistant tasks after providing the video content 170 to the communication group 150 in response to specific inputs received from one or more members 140 of the communication group 150. For example, the response indicating permission from a communication device 110 associated with the selected member 140-1 may also include a request from the member 140-1 to perform a task in addition to providing the video content 170 to the members 140 of the communication group 150. The additional request may take form of an unstructured natural language input (i.e. speech content) that is provided by the member 140 of the communication group 150 in response to the notification to provide permission. Consider a scenario where the members 140 of a communication group 150 are discussing about a suspect who is approximately 5 feet 10 inches tall. The electronic computing device 120 monitoring this conversation determines that video content 170 received from the camera 130 shows a potential suspect who is about 5 feet 10 inches tall. Based on a high level of correlation (i.e., based on features such as 'person' and 'height') between the conversation and the video content 170, the electronic computing device 120 determines that the video content 170 is potentially relevant for the communication group 150 and further transmits a notification to a selected member (e.g., member 140-1) with highest reviewer rank within the communication group 150. The member 140-1 with the highest reviewer rank receives a notification with a message "potentially suspect found, someone about 5 feet 10 inches tall, share video with the group" from the electronic computing device 120. This notification may include specific details about the video content 170 as well as a snapshot of the person or the entire video content 170 received from the camera 130. In response, the electronic computing device 120 receives a notification in which the member provides permission to share the video content 170 with the group 150. In addition, the received notification also further includes a message "yes, that might be the person, but keep looking for taller people." This causes the electronic computing device 120 to not only provide the video content 170 to members 140 of the communication group 150, but also continue to look (i.e., by processing subsequent video content received from the camera 130) for people taller than 5 feet 10 inches. In case, the electronic computing device 120 finds any subsequent video content received from the camera 130 with another person taller than 5 feet 10 inches tall, the electronic computing device 120 may provide the video content 170 showing the other person to members 140 of the communication group 150. In this case, the electronic computing device 120 may provide the subsequent video content directly to the members 150 of the communication group 150 while bypassing the functions specified at blocks 320-360. In other words, the electronic computing device 120 may not again request permission from the selected member 140-1 to provide subsequent video content 170 to the communication group 150. In some cases, the additional information received from the selected member 140-1 may not require further processing of the video content 170 other than updating the video content 170 to highlight a particular object of interest identified by the member. For example, if the video received from the camera 130 shows two persons and the selected member 140-1 reviewing the video responds to the electronic computing device 120 with a message "that looks like our suspect, the one on the left." In this case, the electronic computing device 120 may provide the video content 170 to the members 140 of the group 140, such that the person of interest identified by the selected member is highlighted in the video content 170, but this additional information may not require further content processing.

In accordance with some embodiments, the electronic computing device 120 may determine that video content 170 received from multiple cameras 130 as being potentially relevant to a communication group 150. As an example, assume that the members 140 of a communication group 150 are discussing about a suspicious blue van in a downtown area. The electronic computing device 120 monitoring this conversation detects the presence of blue vans in the downtown area from video content 170 received from several cameras 130 deployed in the downtown area. Based on a high level of correlation (i.e., based on features such as 'vehicle type' and 'color') between the conversation and the video content 170 from multiple cameras 130, the electronic computing device 120 determines that the video content 170 is potentially relevant for the communication group 150 and further transmits a notification to a selected member (e.g., member 140-1) with highest reviewer rank within the communication group 150. For example, the member 140-1 with the highest reviewer rank receives a notification with a message "blue vans found in downtown area. Here are the attributes of the blue vans: yellow signs, black wipers, broken window, green bumper. Share the videos with the group?" from the electronic computing device 120. This notification may include specific details about the video content 170 as well as a snapshot of the blue vans spotted in the downstream area or the entire video content 170 received from the multiple cameras 130. In accordance with some embodiments, the selected member 140-1 receiving this notification may select/deselect the attributes included in the notification and further send a request to the electronic computing device 120 to provide an updated video content 170 that is filtered according to the selected attributes. In response to this request, the electronic computing device 120 may remove video content 170 received from those cameras that do not correspond to the attributes selected by the member 140-1, and may only provide the communication group 150 with the video content 170 received from other cameras that correspond to the attributes selected by the member 140. When multiple videos are presented to each member 140 in the communication group 150, the electronic computing device 120 may cause the notification to presented in a manner that allows the members 140 to select particular video content portions for playback. In addition, the electronic computing device 120 may continue to process the video content 170 subsequently received from the multiple cameras to detect for only those attributes that are selected by the member 140-1, and may further continue to provide only those videos to the group 150 that correspond to the attributes selected by the member 140-1 with highest reviewer rank.

FIGS. 4A-4E show an example incident scenario in which the embodiments described herein can be advantageously used. Consider an incident scenario in which responders are on scene looking for a suspect corresponding to a theft incident and further discussing the incident with a tactical support operator. In this example, assume that the member 140-1 is tactical support operator and is operating the communication device 110-1. Further assume that members 140-2 and 140-3 are first responders on the scene and are respectively operating the communication devices 110-2 and 110-3. The members 140-1, 140-2, and 140-3 are associated with the same communication group 150 and further participating in a group call to discuss the incident. The member 140-1 has obtained information associated with a suspect from a witness (e.g., via 911 emergency call). The member 140-1 then provides the obtained information to other members 140-2 and 140-3 via a group call associated with the communication group 150. For example, the information may be provided as an audio message 410 "A witness saw someone run South. Dark jacket & bag" (see FIG. 4A) that is transmitted from the communication device 110-1 of the member 140-1 to the communication devices 110-2 and 110-3 of the members 140-2 and 140-2, respectively. In accordance with embodiments, the electronic computing device 120 also listens to the conversations exchanged between the members 140-1, 140-2, 140-3 of the communication group 150. In this example, the electronic computing device 120 also receives the audio message 410, for example, from a group call server that is responsible for routing the audio messages between the communication devices 110-1, 110-2, 110-3. At the same time, the electronic computing device may be monitoring video content 170 received from different video sources. In this example, the electronic computing device 120 determines that video content 170 received from a camera 130 (e.g., dash camera of a patrol vehicle) shows a person with a description (i.e., "running south," "dark jacket," "bag") that is matching with the description provided in the audio message 410. Based on the matching description, the electronic computing device 120 determines that the video content 170 received from the camera 130 is potentially relevant for the communication group 150 in which the audio message 410 was transmitted.

Figure 4A:
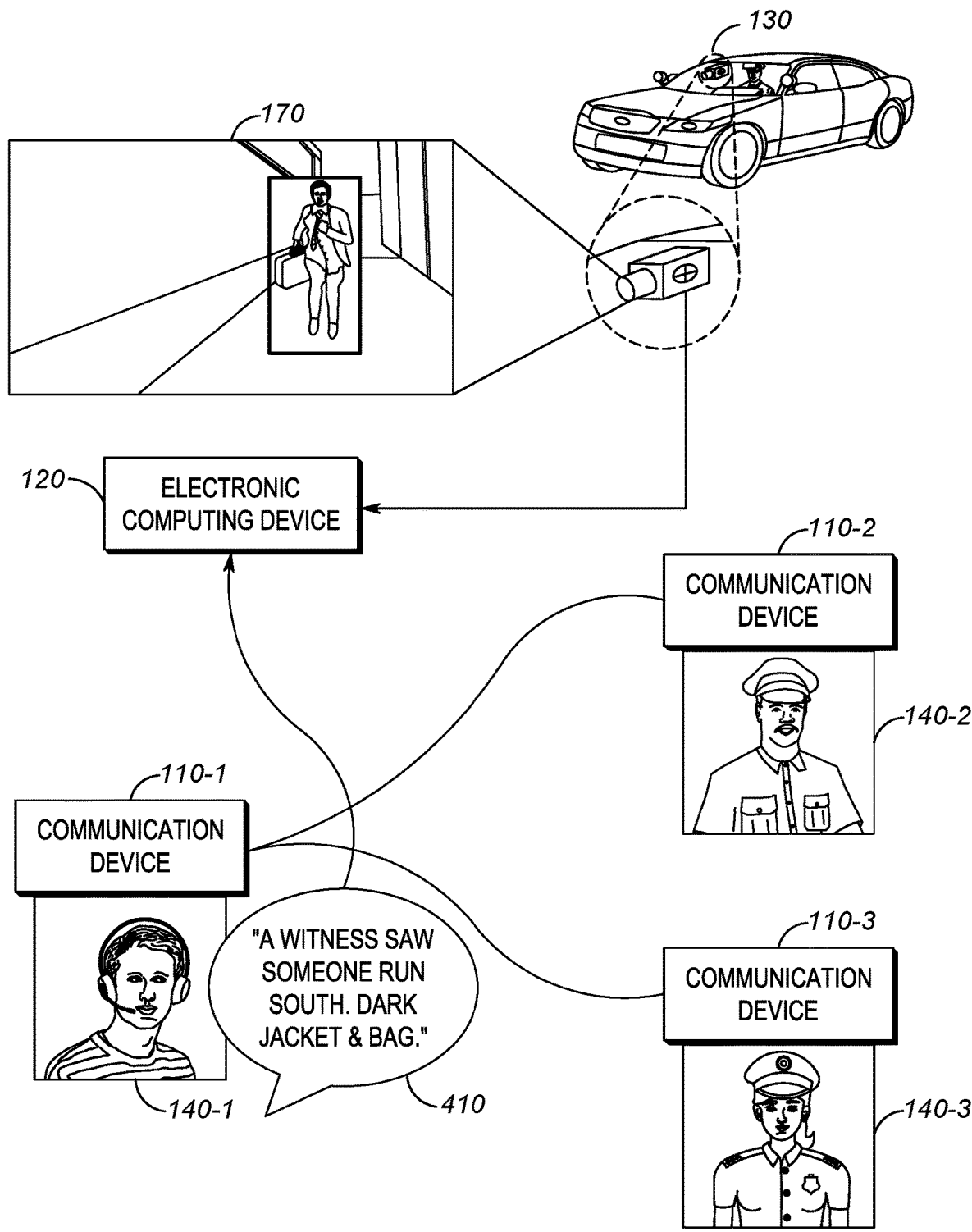
FIGS. 4A-4E illustrate an example incident scenario in which the embodiments described herein can be applied.
Figure 4B:
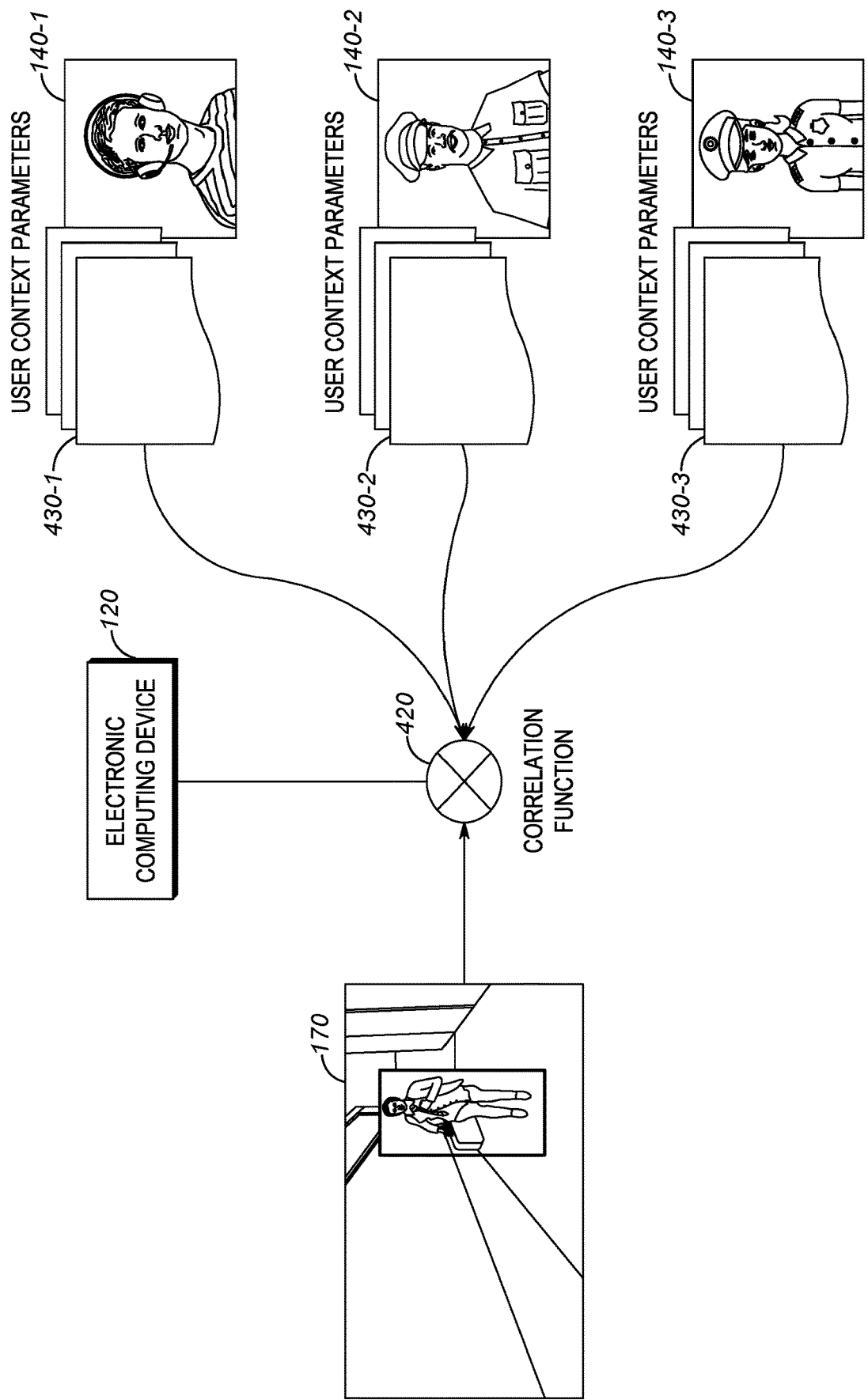
Figure 4C:
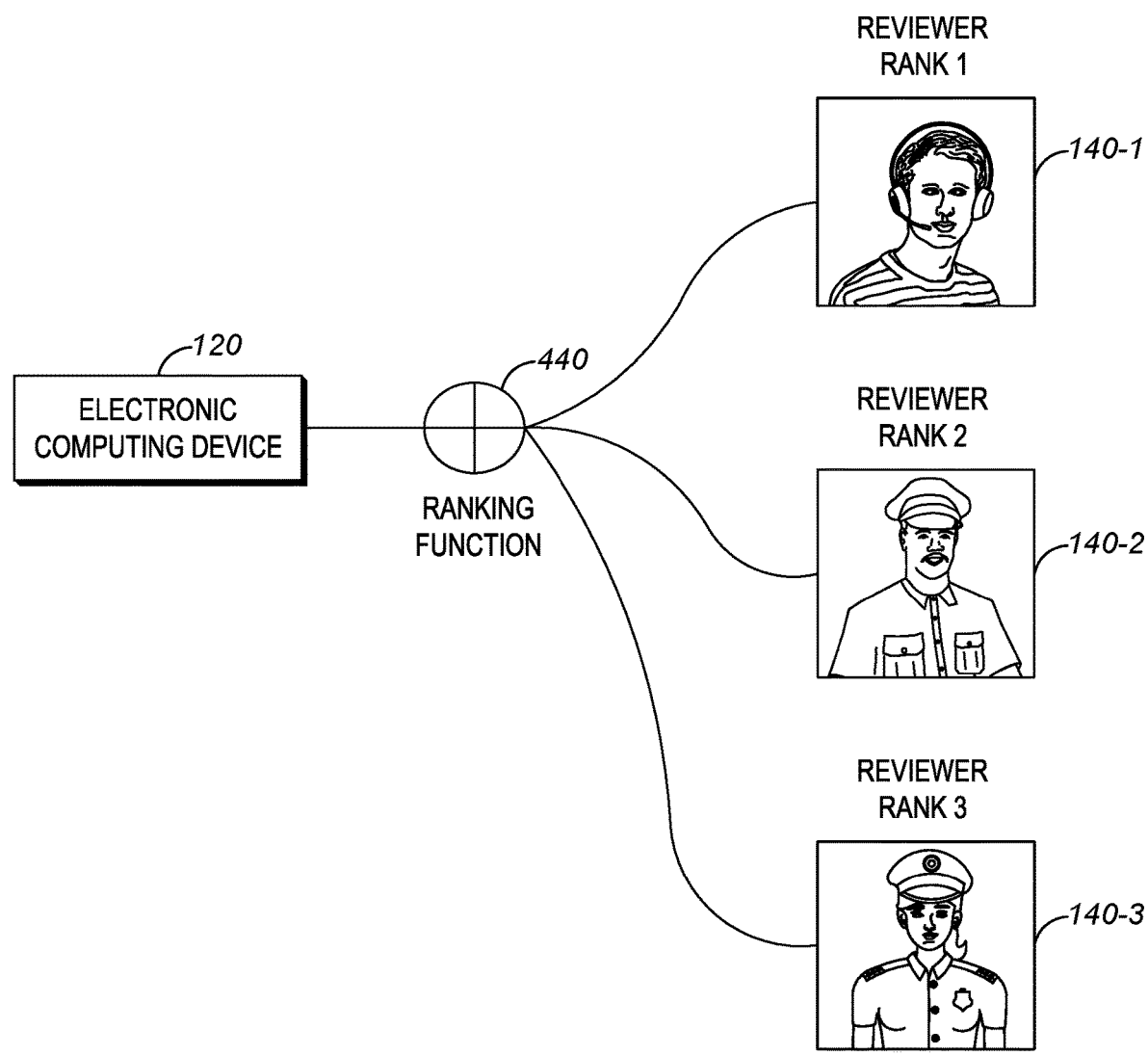

The electronic computing device 120 then begins the process of assigning a reviewer rank to each member 140 of the communication group 150 to request a particular member with highest reviewer rank to review and determine whether the video content 170 is actually relevant for the members 140 of the communication group 150. As shown in FIG. 4B, the electronic computing device 120 uses a correlation function 420 to correlate the video content 170 received from the camera 130 with respective user context parameters (shown as 430-1, 430-2, 430-3). The correlation function 420 may output a weight that is assigned to each user context parameter 430 according to a level of correlation between the video content 170 and respective user context parameter 430 for each member 140. Next, as shown in FIG. 4C, the electronic computing device 120 uses a ranking function 440 to determine a reviewer rank for each member 140 of the communication group 150. The ranking function may output the reviewer rank for each member 140 in the communication group 150 according to the total weight calculated for each member by the correlation function 420. In the example shown in FIG. 4C, the ranking function 440 outputs a highest reviewer rank for member 140-1 followed by members 140-2 and 140-3. The electronic computing device 120 then assigns a reviewer rank to each member according to the rank output by the ranking function 440. In other words, the members 140 are ranked according to the order in which they are capable of making a judgment call concerning the actual relevancy of the video content 170 for the communication group 150. In the example shown in FIG. 4C, the member 140-1 corresponds to the tactical support operator and it is possible that the tactical support operator is identified as the most capable to make a judgement call on the actual relevancy of the video content 170 based on the context that the tactical support operator has obtained initial information about the theft incident.

Figure 4D:
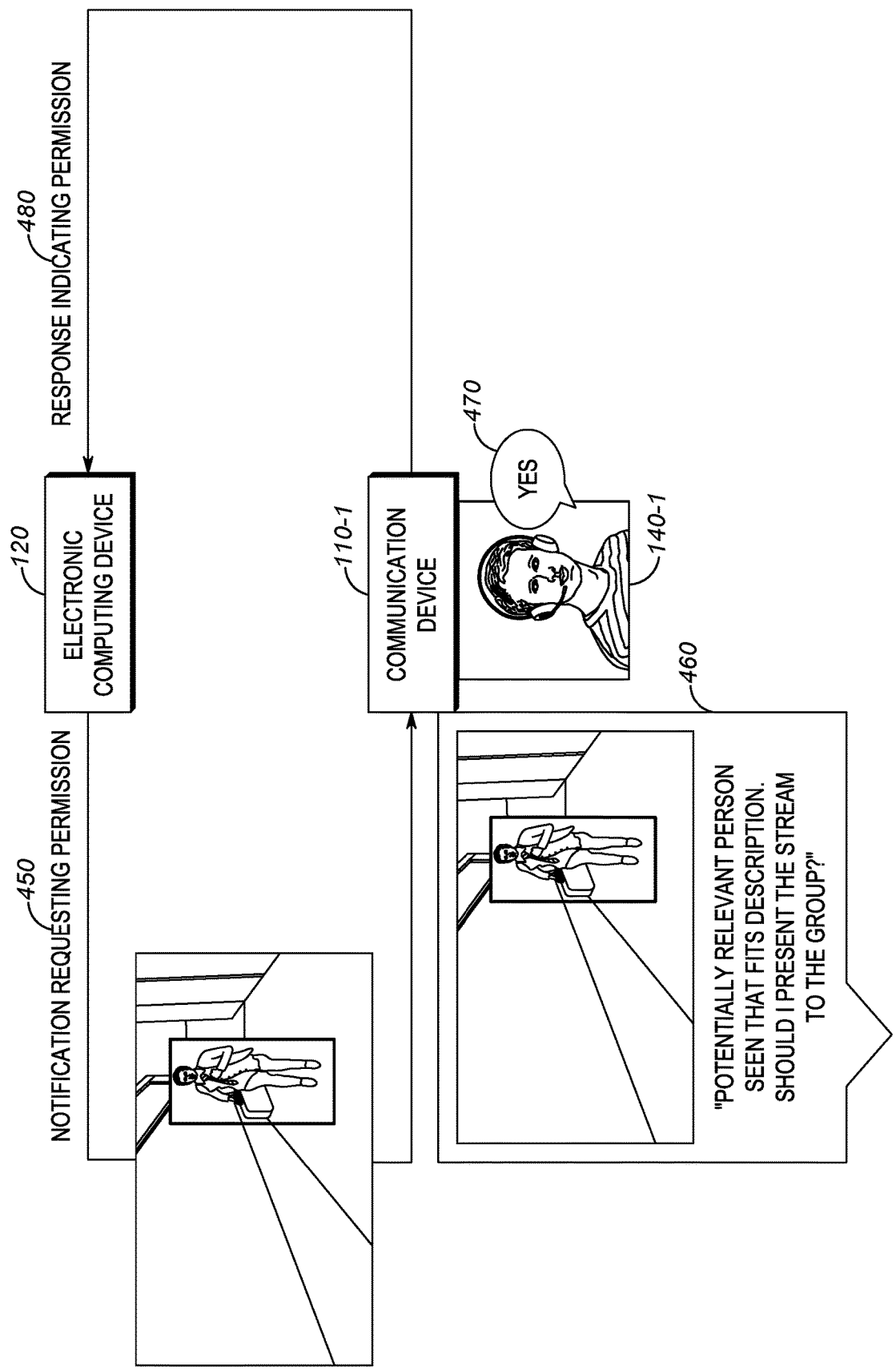

As shown in FIG. 4D, the electronic computing device 120 transmits a notification 450 to the communication device 110-1 associated with the tactical support operator (i.e., member 140-1) requesting permission to provide the video content 170 to the communication group 150. In this example, the electronic computing device 120 may send a notification 450 with a message 460 "Potentially relevant person seen that fits description. Should I present the stream to the group?" along with a snapshot of the suspect which may be displayed at the communication device 110-1 of the member 140-1. The tactical support operator i.e., member 140-1 may review the message 460 and identify that the video content 170 is actually relevant for the communication group 150. The tactical support operator may also provide a response with message 470 "Yes" using the response mechanism provided at the communication device 110-1. In accordance with some embodiments, the response mechanism may be implemented using one or more of: voice input, text input, or on-screen buttons. For example, the member 140-1 may be able to use a dedicated button/key and/or keywords to selectively transmit the response (e.g., to provide permission and/or add additional information) to the electronic computing device 120 while being muted to other members 140-2, 140-3 in an existing group call. Alternatively, on-screen buttons may be provided at the communication device 110-1 to enable the member 140-1 to accept or decline (or select particular video content/video source to stream to the group 150) the request to provide permission to provide the video content 170 to the group 150. The member 140-1 may also transmit a text message to the electronic computing device 120, where the text message includes the response as well as reasons for declining to provide permission.

The message 470 causes the communication device 110-1 to transmit a notification 480 to the electronic computing device 120, which indicates that the permission is provided by the member 140-1. In accordance with some embodiments, as previously described with reference to FIG. 3, the notification may include additional information that allows the electronic computing device 120 to perform additional digital-assistant actions 490 (i.e., in addition to providing the video content 170 to the group 150) such as continuing to process the video stream received from the camera 130 and other video sources, for example, to track the movement of the suspect associated with the theft incident (see FIG. 4E). The additional action may also include a request to the electronic computing device 120 to add the video content 170 as digital evidence corresponding to the incident. In response, the electronic computing device 120 may store the video content 170 at an evidentiary repository (e.g., at a cloud storage) and may further tag the video content 170 as digital evidence corresponding to a particular incident.

Figure 4E:
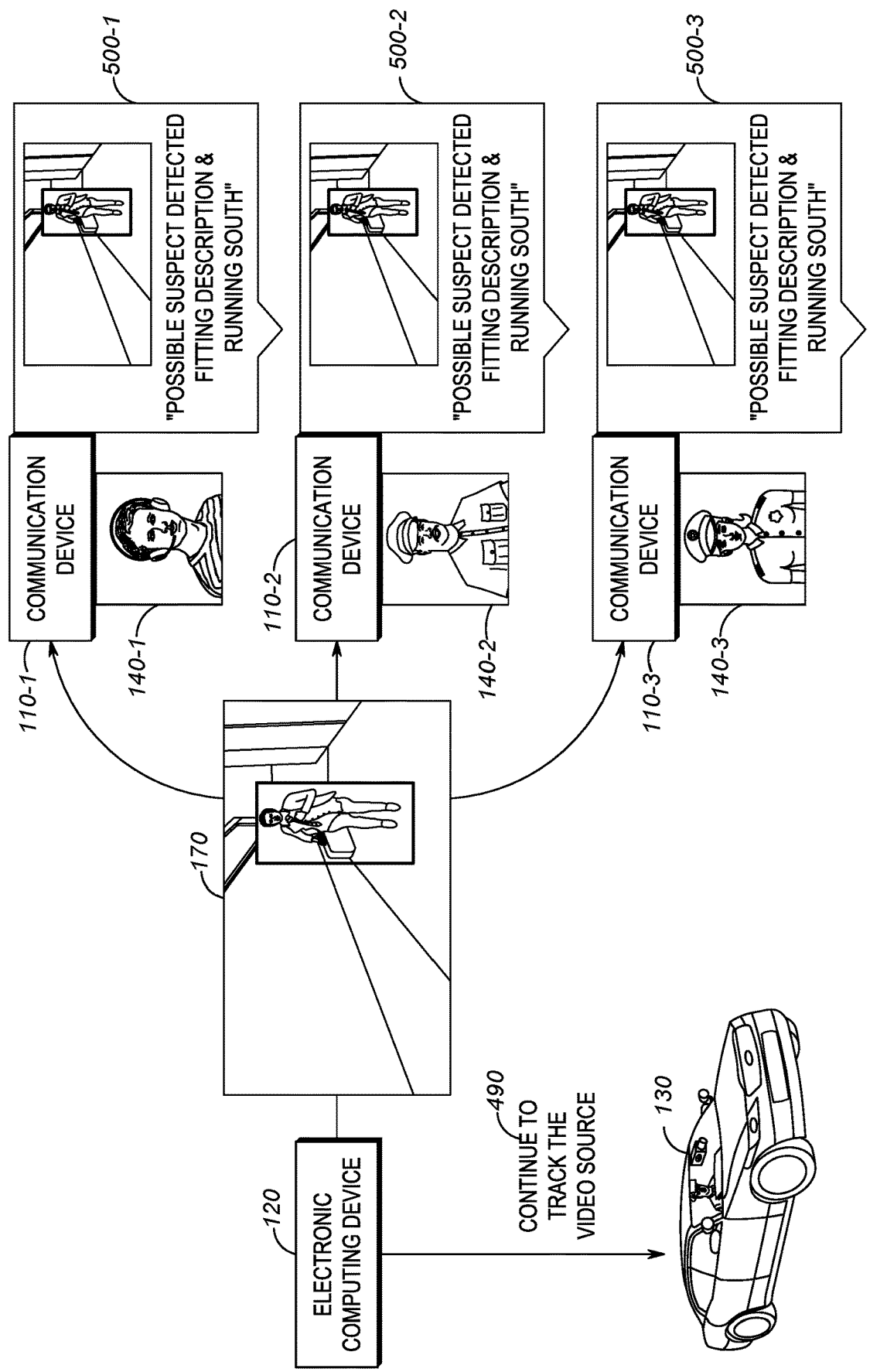

As shown in FIG. 4E, the electronic computing device 120, responsive to receiving the notification 480 from the member 140-1, interrupts an existing group call established between the members 140-1, 140-2, 140-3 of the communication group 150 to transmit the video content 170 via the group call. In this example, each of the communication devices 110-1, 110-2, 110-3 upon receiving the video content 170 from the electronic computing device 120 displays a message "Possible suspect detected fitting description & running South" 500-1, 500-2, 500-3, respectively. The video portion of the message 500 may further include annotations highlighting the suspect identified from the video content. In one embodiment, the electronic computing device 120 leaves the group call after transmitting the video content 170 via the group call. The electronic computing device 120 may also leave the group call in response to receiving an instruction from one of the members 140 (e.g., member 140-1 with highest reviewer rank) of the communication group 150. In this embodiment, the electronic computing device 120 may continue to provide updated video content 170 by re-joining the group call or alternatively by individually providing the updated video content 170 based on member input relative to the video content 170 presented at the respective member's communication device 110.

In accordance with some embodiments, when the message 500 including the video content 170 is displayed at the communication device 110, the members 140 may be able to interact with the video content 170 (e.g., via voice query, on-screen buttons, or text interactions) to control a playback operation (e.g., change the time frame of the video content) associated with the video content 170 being displayed at the respective communication devices. The electronic computing device 120 may provide an updated video content 170 corresponding to a specific frame or a time window (with a start point and end point) during which a particular person, object, or entity of interest has been detected in response to a request from a member 140 of the group 150. As an example, based on the specific input received from a particular member 140, the electronic computing device 120 may cause video content 170 displayed at the particular member's communication device 110 to be rewound to a point at which the person, object, or entity of interest was first detected or appeared in the video content 170. In this example, the member 140 could then individually query the electronic computing device 120 to provide additional information (e.g., "what do I see now"?) related to a particular point/time frame in the video content 170. In response, the electronic computing device 120 may individually transmit a response to a communication device 110 of the requesting member 140 with the requested information, where the response may be provided as an annotation (e.g., by highlighting a particular person of interest) to the video being presented. Similarly, the electronic computing device 120 may also cause the video content 170 to be fast forwarded to a point or selectively playback a portion of the video content between a start point and end point of a time window (e.g., during which a particular event or person, object, or entity of interest was first detected) based on input received from the member 140.

Embodiments described herein can be advantageously implemented to provide only relevant video content to members of a communication group. The accuracy with which a particular video content is determined as being relevant to a group is improved by first independently determining whether the video content is potentially relevant to the group (for example, based on the correlation between the video content and conversations exchanged within the group), followed by requesting a member who is most capable in the group to make a judgment call of whether the video is actually relevant to the group. Embodiments described herein also provides a new technical solution in identifying the member who is most capable of deciding the relevancy of the video content to the group. By providing only relevant video content to users, implementation of the embodiments described may ensure that the user does not miss any valuable information from the video content while also reducing the amount of video content that may otherwise be transmitted on the network (which in turn reduces the load on the network) or presented for user's review (which in turn allows the user to focus on a higher probity task).

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing relevant video content to members of a communication group, the method comprising:
   detecting, at an electronic computing device, a triggering event to provide video content to a plurality of members of a communication group participating in an existing group call established between communication devices of the members;
   responsive to detecting the triggering event, assigning, at the electronic computing device, a reviewer rank to each one of the plurality of members of the communication group based on a correlation between the video content and user context associated with the respective members;
   selecting, at the electronic computing device, from the plurality of members, a member with the assigned reviewer rank higher than the respectively assigned reviewer ranks of other members;
   transmitting, at the electronic computing device, to a communication device associated with the selected member with the assigned reviewer rank higher than the respectively assigned reviewer ranks of other members, a notification requesting permission to interrupt the existing group call and provide the video content to the plurality of members of the communication group, the notification including the video content and an indication to the selected member to review the video content and determine whether the video content is relevant for the members of the communication group; and
   responsive to receiving permission from the communication device associated with the selected member to interrupt the existing group call, providing, at the electronic computing device, the video content to the plurality of members associated with the communication group via the existing group call by interrupting the existing group call established between the communication devices of the members.

2. The method of claim 1, further comprising:
   causing the electronic computing device to leave the existing group call after transmitting the video content to the plurality of members.

3. The method of claim 1, wherein responsive to providing the video content to the members of the communication group, the method comprising:
   receiving, at the electronic computing device, a response from one of the members the communication group, the response requesting to provide an updated video content corresponding to a time frame during which a person, object, or entity of interest has been first detected in the video content; and
   transmitting, at the electronic computing device, to a communication device associated with the one of the members of the communication group, updated video content corresponding to the time frame during which the person, object, or entity of interest has been first detected in the video content.

4. The method of claim 1, wherein assigning further comprises:
   selecting a plurality of user context parameters associated with the user context;
   assigning a weight to each of the user context parameters according to a level of correlation between the video content and respective user context parameters associated with the user context; and
   calculating a total weight that is sum of respective weights assigned to each of the user context parameters,
   wherein a member with highest reviewer rank has a total weight that is higher than respective total weights of the other members.

5. The method of claim 1, wherein assigning comprises:
   monitoring conversations exchanged within the existing group call between the members of the communication group; and
   assigning the reviewer rank to each one of the members based on a correlation between the video content and the user context identified from the conversations associated with the respective members.

6. The method of claim 1, wherein detecting the triggering event comprises:
   receiving, at the electronic computing device, the video content from a camera;
   monitoring, at the electronic computing device, using a natural language processing engine, conversations exchanged within the existing group call between the members of the communication group;

processing, at the electronic computing device, using a video analytics engine, the video content to identify one or more of person, object, or entity of interest from the video content;

determining, at the electronic computing device, that the conversations exchanged within the existing group call are related to the one or more of person, object, or entity of interest identified from the video content; and determining that the video content is potentially relevant for the communication group.

7. The method of claim 1, wherein detecting the triggering event comprises:

receiving, at the electronic computing device, an instruction from a computer aided dispatch server to provide the video content to the communication group.

8. The method of claim 1, wherein when no response to the notification is received from the communication device, the method further comprising:

selecting, at the electronic computing, from the plurality of members, a member with next highest reviewer rank;

transmitting, at the electronic computing device, to a communication device associated with the member with the next highest reviewer rank, a request for permission to interrupt the existing group call and provide the video content to each of the members of the communication group; and repeating, at the electronic computing device, the steps of selecting a member with the next highest reviewer rank and transmitting the request until a permission is received or the notification is transmitted to each of the plurality of members of the communication group.

9. The method of claim 1, wherein when a response received from the communication device indicates that the selected member with the assigned reviewer rank higher than the respectively assigned reviewer ranks of other members has declined to provide the permission, the method further comprising:

determining, at the electronic computing device, that the response includes additional information identifying a reason for the member's determination that the video is not relevant to the communication group; and updating, at the electronic computing device, a video analytics engine associated with the electronic computing device using the information included in the response.

10. The method of claim 1, wherein the notification is transmitted via a private call to the communication device associated with the selected member with the assigned reviewer rank higher than the respectively assigned reviewer ranks of other members.

11. The method of claim 1, wherein the video content further includes annotations highlighting one or more of person, object, or identity of interest that are identified from the video content.

12. The method of claim 1, wherein the user context includes information selected from the group consisting of:
a location of the member;
an agency to which the member is affiliated;
rank, experience, role, skill level, or knowledge level of the member;
conversations or actions associated with the member;
sensor data associated with the member; and
an incident associated with the member.

13. An electronic computing device, comprising:
an electronic processor; and
a communications unit communicatively coupled to the electronic processor, wherein the electronic processor is configured to:

detect a triggering event to provide video content to a plurality of members of a communication group participating in an existing group call established between communication devices of the members;

assign a reviewer rank to each one of the plurality of members of the communication group based on a correlation between the video content and a user context associated with the respective members;

select, from the plurality of members, a member with the assigned reviewer rank higher than the respectively assigned reviewer ranks of other members;

transmit, via the communications unit, to a communication device associated with the selected member with the assigned reviewer rank higher than the respectively assigned reviewer ranks of other members, a notification requesting permission to interrupt the existing group call and provide the video content to the plurality of members of the communication group, the notification including the video content and an indication to the selected member to review the video content and determine whether the video content is relevant for the members of the communication group; and provide, via the communications unit, the video content to the plurality of members associated with the communication group via the existing group call by interrupting the existing group call established between the communication devices of the members when a response indicating permission to interrupt the existing group call is received from the communication device associated with the selected member.

14. The electronic computing device of claim 13, wherein the electronic processor is configured to:

receive, via the communications unit, a response from one of the members the communication group, the response requesting to provide an updated video content corresponding to a time frame at which a person, object, or entity of interest identified from the video content has been first detected; and transmit, via the communications unit, to a communication device associated with the one of the members of the communication group, updated video content corresponding to the time frame during which the person, object, or entity of interest has been first detected in the video content.

15. The electronic computing device of claim 13, wherein the electronic processor is configured to:

receive, via the communications unit, the video content from a camera;

monitor, using a natural language processing engine, conversations exchanged within the existing group call between the members of the communication group;

process, using a video analytics engine, the video content to identify one or more of person, object, or entity of interest from the video content;

determine that the conversations exchanged within the existing group call are related to the one or more of person, object, or entity of interest identified from the video content; and determine that the video content is potentially relevant to the communication group.

* * * * *